United States Patent [19]
Krohn et al.

[11] 4,199,332
[45] Apr. 22, 1980

[54] DEAERATOR DEVICE

[75] Inventors: Dennis G. Krohn, Pekin; John C. Wellauer, Dunlap, both of Ill.

[73] Assignee: Caterpillar Tractor Co., Peoria, Ill.

[21] Appl. No.: 29,812

[22] Filed: Apr. 13, 1979

Related U.S. Application Data

[63] Continuation of Ser. No. 858,227, Dec. 7, 1977, abandoned.

[51] Int. Cl.² ............................................. B01D 19/00
[52] U.S. Cl. ......................................... 55/191; 55/203
[58] Field of Search .................... 55/41, 52, 184, 191, 55/192, 203, 456, 457; 123/41.44, 41, 54; 165/110, 111

[56] References Cited

U.S. PATENT DOCUMENTS

| | | | |
|---|---|---|---|
| 1,279,758 | 9/1918 | Putnam | 55/203 X |
| 2,200,620 | 5/1940 | Findley | 55/191 X |
| 2,316,729 | 4/1943 | Tryon | 55/204 X |
| 2,494,427 | 1/1950 | Bidwell et al. | 55/203 |
| 3,028,716 | 4/1962 | Sanderson et al. | 55/203 |
| 3,201,919 | 8/1965 | Long | 55/191 X |
| 3,349,548 | 10/1967 | Boyen | 55/457 |
| 4,075,984 | 2/1978 | Kirchgessner et al. | 123/41.54 |

*Primary Examiner*—Charles N. Hart
*Assistant Examiner*—Richard W. Burks
*Attorney, Agent, or Firm*—Charles E. Lanchantin, Jr.

[57] ABSTRACT

A deaerator device has a tubular casing and an internal helical blade defines an axial opening through the center thereof toward which entrained gas bubbles will converge as a fluid travels through the casing. A vent pipe collects the gas bubbles at the opening and communicates them away from the casing.

6 Claims, 2 Drawing Figures

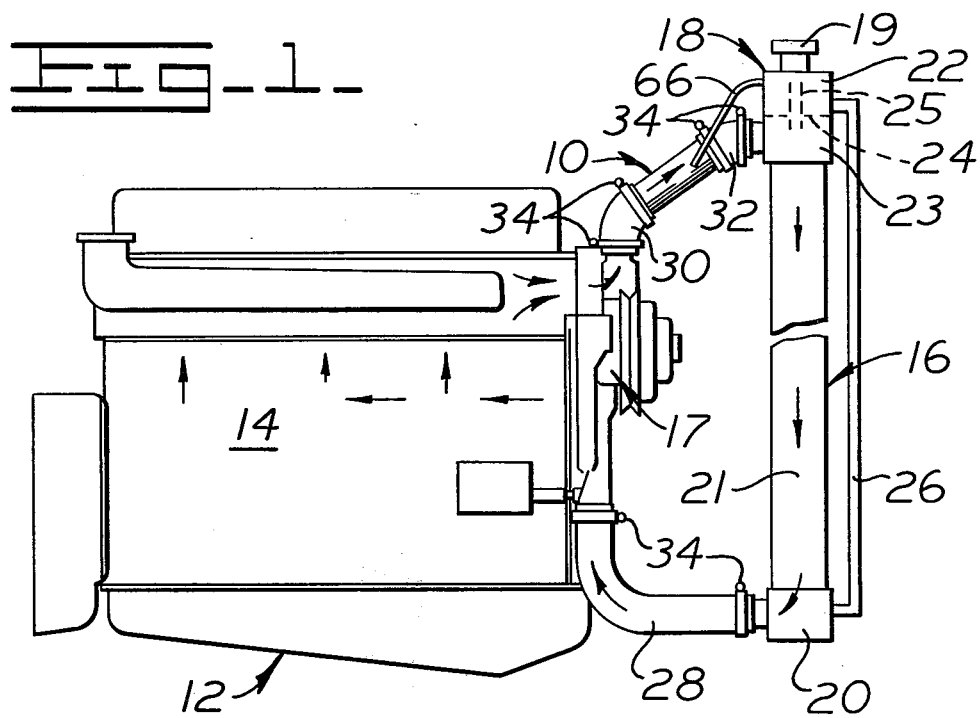
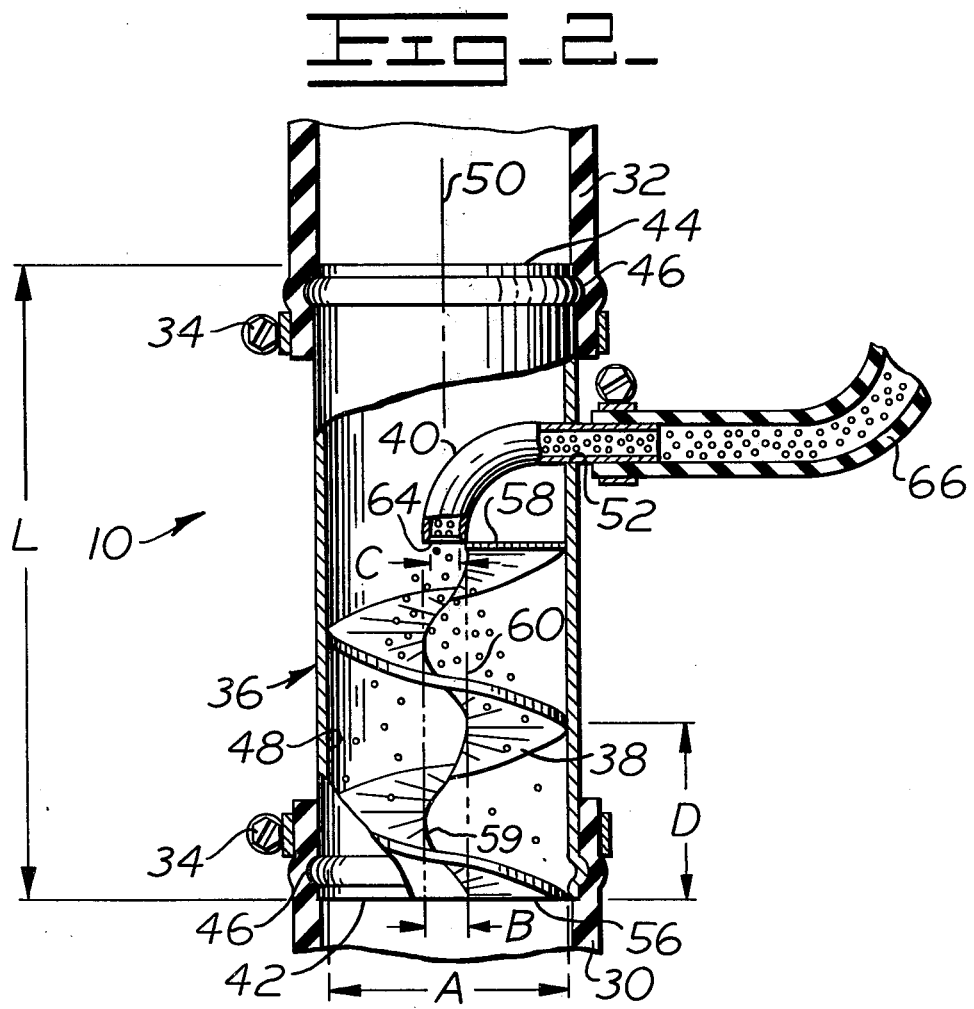

DEAERATOR DEVICE

This is a continuation of Ser. No. 858,227, filed Dec. 7, 1977, now abandoned.

BACKGROUND OF THE INVENTION

This invention relates generally to a deaerator device, and more particularly to a compact deaerator device for effectively separating gas from a fluid by centrifugal action.

It is common to circulate a cooling fluid through an engine and an associated heat exchanger or radiator core, but frequently gas is entrained in the fluid. This decreases the volume of fluid circulated by the pump and decreases the efficiency of the closed loop cooling system as the fluid and entrained air recirculates therethrough. This can cause undesirable heating of the engine and can lead to such a diverse and undesirable side effect as pitting of the internal surfaces of certain engine components.

While various radiator top tank constructions have been employed to separate air and gas bubbles from the fluid coolant by utilizing baffles and swirl chambers, such constructions have not been satisfactory from the standpoint that they have increased the size and expense of the radiator system to an excessive degree.

Exemplifying the prior art in the field of devices for separating gas from a fluid are U.S. Pat. Nos. 1,279,859 issued Sept. 24, 1918 to J. K. Putnam; 2,316,729 issued Apr. 13, 1943 to H. C. Tryon; 2,494,427 issued Jan. 10, 1950 to J. B. Bidwell, et al; and 3,028,716 issued Apr. 10, 1962 to R. W. Sanderson, et al. However, such prior constructions are excessively long, complex, and costly, or have been relatively ineffective in separating the gas bubbles from the fluid at a desirably low pressure drop. More specifically, some prior art deaerators have had centrally located plugs or pipes which have interfered with the desired straight-through fluid flow path. Other deaerators have had restrictive passages for the gas bubbles to go through. These major disadvantages contribute to excessive pressure drop or ineffectiveness.

In view of the above, it would be advantageous to provide merely the addition of a simple and compact device to any existing engine cooling system. Preferably, such a device should be capable of convenient insertion in series with the existing hoses or conduits of the engine cooling system and should not create an excessive pressure drop by incorporating bends or walls which require a substantial change in direction of the cooling fluid.

SUMMARY OF THE INVENTION

The present invention is directed to overcoming one or more of the problems as set forth above.

According to the present invention this is accomplished by providing a deaerator device including a single tubular casing having a substantially uninterrupted cylindrical inner wall, and a helical blade connected to the inner wall which defines an unobstructed central opening on the axis of the casing. The helical blade moves entrained gas bubbles convergingly inwardly toward the axis as fluid flows through the casing, and a vent pipe having an entry end located adjacent the exit end of the helical blade collects gas bubbles emenating from the central opening and communicates them outwardly of the casing.

Advantageously, the instant deaerator device provides a substantially straight-through flow path for a relatively low pressure drop across it, and is constructed so that it can be conveniently connected in series with a hose line of an engine cooling system or the like. Moreover, it not only is axially and radially compact, but also has a high degree of effectiveness.

Other advantages of the present invention will become more readily apparent upon reference to the accompanying drawings and the following description.

BRIEF DESCRIPTION OF THE DRAWINGS

FIG. 1 is a diagrammatic side elevational view of an engine cooling system incorporating the deaerator device of the present invention thereon.

FIG. 2 is a diagrammatic and enlarged view of the deaerator device shown in FIG. 1 with a portion broken open to better illustrate details of its internal construction.

DETAILED DESCRIPTION

Referring to FIGS. 1 and 2 there is shown a deaerator device 10 constructed in accordance with the present invention in series with a pressurized engine cooling system 12. The engine cooling system generally includes a fluid-cooled engine 14, a heat exchanger or radiator 16, and motor means 17 such as a conventional engine driven pump for circulating fluid in a substantially closed loop therebetween. More particularly, the radiator has a dual compartment top or inlet tank 18 with a conventional filler and pressure relief cap 19 releasably connected to the top thereof, a bottom or outlet tank 20, and a core 21 interposed between the tanks with a plurality of fluid passages of the usual type therein. The top tank is divided into an upper section 22 and a lower section 23 by a horizontal partition 24, and a venting standpipe 25 extends through the partition toward the top of the upper section. A shunt line 26 extends from the bottom of the upper section to the bottom tank for filling purposes.

A flexible conduit or hose 28 is releasably connected to the radiator bottom tank 20 and to the engine 14 adjacent the pump 17 for communicating fluid from the radiator 16 to the pump and subsequently through various internal passages in the engine, not shown, as representatively shown by the flow indicating arrows. After passing through the engine and being heated thereby, the fluid passes outwardly to a flexible outlet conduit or hose 30 releasably connected to the engine. The deaerating device 10 is releasably coupled in series between this outlet hose and another conduit or hose 32 releasably coupled to the lower section 23 of the top tank 18 to generally complete the closed loop recirculating cooling system 12.

Preferably, the hoses 28, 30 and 32 are of rubber or elastomeric material and telescopically overlap their respectively associated and preferably rigid metal parts so that a plurality of encircling hose clamps 34 can be utilized therewith. Particularly, in a well known manner, such clamps are individually adjustable by a screwdriver or wrench to tightly and sealingly couple the ends of the hoses thereto.

Turning now to FIG. 2, it may be noted that the deaerator device 10 generally includes a single tubular casing 36, a single helical blade 38 within the casing, and a vent pipe 40. The axially compact tubular casing is generally cylindrical in construction with an inlet end 42, an outlet end 44, and an annular hose engaging coupling or ridge 46 at each of these ends. Preferably, the tubular casing is made of metal and the annular ridges are integrally formed therein. The hose clamps 34 encircle and tightly clamp the respective hoses 30 and 32 to the exterior surface of the tubular casing immediately adjacent and axially inwardly of these ridges to provide a more positive seal thereat. Moreover, the tubular casing also has a substantially uninterrupted cylindrical internal wall 48 having a preselected diameter A arranged along a central axis 50, and a radial opening 52 is provided therethrough.

The helical blade 38 is preferably constructed of either metal or plastic material having an inlet edge 56, and outlet edge 58, and preferably at least one and not more than about three revolutions therebetween. In accordance with one aspect of the invention the helical blade has turns of constant slope between the opposite edges 56 and 58, a substantially constant external diameter so that it can make sealed engagement with the internal wall 48 of the tubular casing 36, and a substantially constant internal diameter at a radially inner spiraling edge 59 serving to define an unobstructed cylindrical axial opening 60 for the free passage of fluid centrally therethrough along the axis 50. The axial or central opening 60 preferably has a preselected diameter B having a range of from 10% to 25% of the preselected diameter A of the internal wall 48. Preferably also, the inlet edge 56 of the blade is located adjacent to the inlet end 42 of the tubular casing, and the outlet edge 58 is located between 50% and 75% of the overall length L of the casing from the inlet end.

Referring now to the vent pipe 40, it may be noted to extend through the opening 52 in the tubular casing 36. The pipe has a right angle radius bend so that it is substantially normal to the casing at the opening 52 and is substantially parallel to and concentric with the axis 50 at an entry end 64. The entry end of the intake pipe has a preselected inside diameter C and is located adjacent the outlet edge 58 of the blade. Preferably, the entry end is stabilizingly secured to the helical blade substantially at the outlet edge. A flexible conduit or hose 66 is releasably connected to the vent pipe exteriorly of the tubular casing and is in communication with the top of the upper section 22 of the top tank 18 as is shown in FIG. 1.

Two embodiments of the deaerator device 10 have the following parameters:

|  | Example 1 | Example 2 |
| --- | --- | --- |
| I.D. of casing 36 (A) | 59.3 mm (2.33") | 59.3 mm (2.33") |
| I.D. of opening 60 (B) | 11.1 mm (0.44") | 11.1 mm (0.44") |
| I.D. of pipe 62 (C) | 6.2 mm (0.25") | 6.2 mm (0.25") |
| Overall axial length (L) | 152.4 mm (6.00") | 152.4 mm (6.00") |
| Helix lead (D) | 42.0 mm (1.65") | 57.2 mm (2.25") |
| Revolutions of blade | 2 | 1.5 |

In each of the above noted examples, the tubular casing 36 is substantially an uninterrupted cylindrical tube with the overall length L being perferably limited to less than about three times the inside diameter A of the casing. This provides an extremely compact deaerator device while sumultaneously having maximum effectiveness. While a tubular casing having an overall length greater than three times the inside diameter of the internal wall 48 could be constructed, it would either be more difficult or impossible to install between the engine 14 and radiator 16 in the extremely limited space normally provided on a vehicle, for example.

In operation, a fluid such as heated water with entrained gas bubbles therein is delivered upwardly to the deaerator device 10 by the pressurized engine cooling system 12. The helical blade 38 thereby imparts a swirling motion to the water so that the water is forced radially outwardly by centrifugal action and the lighter gas bubbles are displaced and converge radially inwardly toward the axis 50 as the water moves axially through the tubular casing 36. Subsequently, the gas bubbles congregate in a converging manner within the axial opening 60, whereupon the water and gas bubbles are collected at the entry end 64 of the vent pipe 40. In this way the major portion of the recirculating water flow, for example more than 70%, without excessive aeration is directed to the lower section 23 or liquid part of the top tank 18, while the remainder is directed from the vent pipe 40 to the top of the upper section 22 or gaseous part of the top tank via the hose 66.

It is contemplated that the entry end 64 of the vent pipe 40 may be divergingly flared as shown in FIG. 2, or may be otherwise presented with a compact conical intake collector, not shown, to better funnel the gas bubbles emanating from the juxtaposed opening 60 within the helical blade 38 into the vent pipe. It being understood that the facing cross sectional areas of the opening 60 and the vent pipe can be tailored to match the parameters of the cooling system 12.

Other aspects, objects and advantages will become apparent from a study of the specification, drawings and appended claims.

The embodiments of the invention in which an exclusive property or privilege is claimed are defined as follows:

1. A deaerator device (10) comprising:
   a tubular casing (36) having a substantially uninterrupted cylindrical inner wall (48), a central axis (50), an axially open inlet end (42), an axially open outlet end (44), and a radial opening (52) therethrough;
   a helical blade (38) connected to said inner wall (48), said helical blade (38) having an outlet edge (58) and a radially inner spiraling edge (59) defining an unobstructed central opening (60) on the axis (50), said unobstructed central opening (60) being defined solely by said radially inner spiraling edge (59), said helical blade (38) being of a construction sufficient for moving entrained gas bubbles relatively freely and convergingly toward the axis (50) and said central opening (60) as fluid to be treated flows axially into said axially open inlet end (42) through said tubular casing (36) and axially out said axially open outlet end (44); and
   a vent pipe (40) having an entry end (64) located adjacent said outlet edge (58) of said helical blade (38) on the axis (50), said vent pipe (40) extending inwardly through said radial opening (52) and being of a construction sufficient for receiving the gas bubbles emanating axially from said central opening (60) and communicating the gas bubbles radially outwardly of the tubular casing (36).

2. The deaerator device (10) of claim 1 wherein said inner wall (48) has a first preselected diameter, said central opening (60) has a second preselected diameter, and said second preselected diameter is between about 10 and 25 percent of said first preselected diameter.

3. The deaerator device (10) of claim 1 wherein said helical blade (38) is a single blade having less than about three revolutions.

4. The deaerator device (10) of claim 1 wherein said tubular casing (36) has an annular hose engaging ridge (46) at each of said inlet and outlet ends (42,44).

5. The deaerator device (10) of claim 1 wherein said entry end (64) of said vent pipe (40) is connected to said helical blade (38).

6. The deaerator device (10) of claim 1 wherein said tubular casing (36) has a preselected overall length between said inlet and outlet ends (42,44), said entry end (64) of said vent pipe (40) being located between 50 and 75 percent of said overall length from said inlet end (42) of said tubular casing (36).

* * * * *